United States Patent Office 2,867,043
Patented Jan. 6, 1959

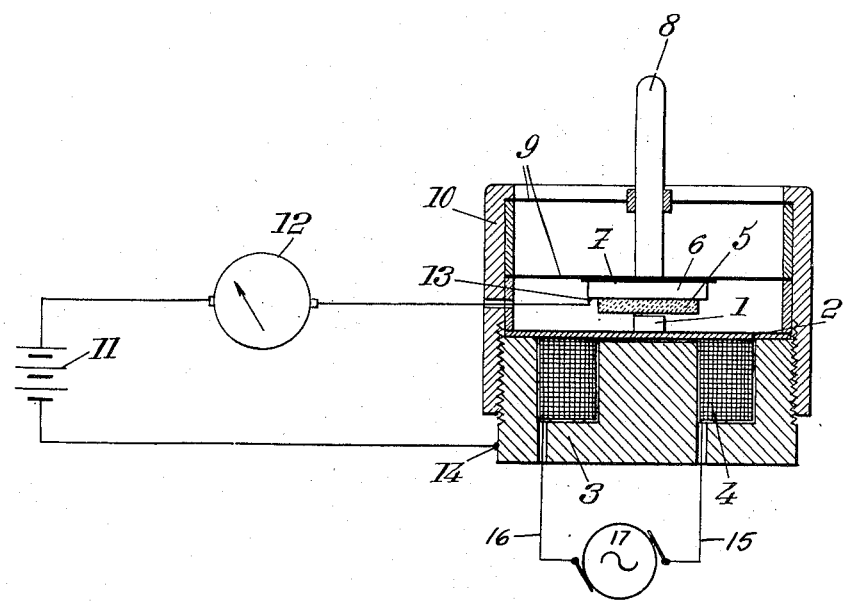

2,867,043

VARIABLE ELECTRIC RESISTANCE SEMI-CONDUCTOR DEVICES

Jean Marie Baptiste Jarret and Jacques Henri Jarret, Lyon, France, assignors to "Les Applications Electroniques des Caoutchoucs" (A. E. C.), Courbevoie, France, a corporation of France Application October 2, 1953, Serial No. 383,833

Claims priority, application France October 16, 1952

3 Claims. (Cl. 33—172)

The present invention relates to variable electric resistance semi-conductor devices of the kind described in our U. S. patent application Ser. No. 136,932, filed January 5, 1950, now Patent No. 2,690,489, issued September 28, 1954, for "Conductor Devices Having a Variable Electric Resistance." Such devices include semi-conductor elements made of a material having a rubber-like elasticity (rubber or another equivalent plastic material, and in particular silicone) in which are incorporated very fine conductor particles (carbon) having for instance an average diameter lower than five hundredths of a micron.

The chief object of the present invention is to provide devices of this kind which are better adapted to meet the requirements of practice than those known up to the present time and in particular which are more stable.

The chief feature of our invention consists in combining with such devices means for exerting an alternating mechanical stress between the semi-conductor element and the electrode with which it cooperates, whereby a vibratory effect takes place.

A preferred embodiment of the present invention will be hereinafter described with reference to the accompanying drawings, given merely by way of example, and in which:

The only figure is a diagrammatical sectional view of a variable contact resistor device for measuring displacements, made according to our invention.

The apparatus shown by the drawing is intended to indicate small displacements of an element by means of the variations of resistance produced in the semi-conductor in response to such displacements.

Our experiment in this field shows that when we place in contact with each other under a given electrical voltage a metallic electrode and a semi-conductor element carried by a rigid support, the contact resistance does not immediately assume a stable value. After the parts have been placed in contact with each other, and even if the respective positions of the metallic electrode and of the semi-conductor support are perfectly fixed, the contact resistance in the circuit including the electrode and the semi-conductor element keeps varying to a substantial degree, and it may in particular drop from 10 to 50%, according to the experimental conditions, during a time which is variable and may range from some minutes to some hours and even to some days.

This involves considerable difficulties in the use of such devices for measuring or detecting aperiodic or low frequency mechanical phenomenons which act upon the contact of the semi-conductor with the metallic electrode.

According to our invention, we subject the contacting parts to vibrations which quickly or instantaneously stabilize the electrical contact resistance or the mean value of this resistance.

For instance, these vibrations (that is to say this reciprocating movement) are imparted to the metallic electrode and the semi-conductor element is carried by a fixed support (or at least a support which is movable only in response to the displacements to be measured or to another phenomenon to be recorded). Of course, we might use the reverse arrangement, that is to say keep the metallic electrode fixed and impart the vibratory displacements to the semi-conductor element.

Preferably, the reciprocating movement to be applied will be in the same direction as the displacement to be measured (when the apparatus is intended for such a measurement), and its frequency will be substantially higher than that of the phenomenon to be detected. The amplitude of the reciprocating movement thus applied will be advantageously chosen higher than that of the phenomenon to be detected, and in particular to the range of amplitudes for the measurement to be made.

In the construction shown by the drawing, the apparatus includes:

An electrode 1 intended to cooperate with the pellet which constitutes the semi-conductor element, this electrode being carried by an elastic support 2 subjected to the action of an electro-magnet 3 the coil 4 of which is fed with currents of the desired frequency (for instance 100 periods per second) from an alternating current source 17 connected through conductors 15 and 16 with said coil 4. Said support may constitute the armature of the magnetic circuit;

A pellet 5 made of a semi-conductor material, this pellet being intended to give with the electrode 1 a variable contact resistance and being carried by a support 6, preferably insulated at 7;

And means for transmitting relative displacements to said support 6 and its pellet 7 in response to the displacements, lengths or phenomenons to be measured. Such means are constituted, in the embodiment illustrated by the drawing, by a mechanical contact member 8 connected to support 6 and provided with means for guiding or positioning said member such as diaphragms 9.

The whole is mounted in a casing 10.

The apparatus further comprises an electrical circuit including a source of current 11 and a measurement apparatus 12, this circuit being connected at 13 and 14 to the contact resistance formed by the semi-conductor element and the metallic electrode.

The apparatus is adjusted so that when coil 4 is not energized, there is no contact between electrode 1 and pellet 5. As soon as the alternating energizing is applied, the electrode vibrates and periodically comes into contact with pellet 5. This produces an alternating contact resistance which corresponds to a given position of the pointer of ammeter (or other like apparatus) 12 on the dial of this apparatus. This position, which corresponds to the average value of the contact resistance, will be for instance on graduation zero (any adjustment means may be provided in order to obtain this position of adjustment, said means acting through abutments or other means upon one of the factors of the system, for instance upon the relative positions of rest of electrode 1 and pellet 5).

As soon as mechanical member 8 is actuated for a measurement operation, a variation of pressure is obtained which is instantaneously translated by a deflection of the pointer of ammeter 12.

Such an apparatus makes it possible for instance to measure with a precision of about 0.2 micron variations of length averaging 20 microns.

Our invention makes it possible to provide high accuracy apparatus such as comparators, extensometers, balances, pressure gauges, and so on, and in a general manner all apparatus making use of contact resistors of the above mentioned kind, especially in the case of aperiodic or low frequency phenomenons.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A measurement apparatus of the type described which comprises, in combination, an electric circuit including in series a source of current, a semi-conductor element made of a material having a rubber-like elasticity in which are incorporated very fine conductor particles, an electrode arranged to cooperate with said element, and an electric measurement device in said circuit responsive to resistance variations therein, means for imparting a vibratory auxiliary relative displacement to said semi-conductor element and said electrode to bring them periodically into and out of contact with each other, and means for imparting to said two last mentioned parts, in a direction parallel to said vibratory displacement, a main relative displacement to be measured, the amplitude of said vibratory auxiliary displacement being higher than the range of said main relative displacement.

2. A measurement apparatus of the type described which comprises, in combination, an electric circuit including in series a source of current, a semi-conductor element made of a material having a rubber-like elasticity in which are incorporated very fine conductor particles, an electrode arranged to cooperate with said element, and an electric measurement device in said circuit responsive to resistance variations therein, means for resiliently holding said semi-conductor element and said electrode at a small distance from each other, means for imparting a vibratory auxiliary relative displacement to said last two mentioned parts to bring them periodically into and out of contact with each other, and means for imparting to said two last mentioned parts, in a direction parallel to said vibratory displacement, a main relative displacement to be measured.

3. A measurement apparatus of the type described which comprises, in combination, an electric circuit including in series a source of current, a semi-conductor element made of a material having a rubber-like elasticity in which are incorporated very fine conductor particles, an electrode arranged to cooperate with said element, and an electric measurement device in said circuit responsive to resistance variations therein, a casing containing said semi-conductor element, resilient means for holding said semi-conductor element in said casing, means for elastically suspending said electrode in said casing at a small distance from said semi-conductor element, said electrode being, in the state of rest, out of contact with said semi-conductor element, an electro-magnet inserted in said circuit for imparting a vibratory auxiliary relative displacement to said electrode with respect to said casing to bring said electrode periodically into and out of contact with said semi-conductor element, and means for transmitting to said semi-conductor element, in a direction parallel to said vibratory displacement, a main relative displacement to be measured.

References Cited in the file of this patent
UNITED STATES PATENTS

| | | |
|---|---|---|
| 1,261,817 | Jepson | Apr. 9, 1918 |
| 2,429,137 | Root | Oct. 14, 1947 |
| 2,439,092 | Linstrom | Apr. 6, 1948 |
| 2,440,342 | Maybe | Apr. 27, 1948 |
| 2,471,601 | Albright | May 31, 1949 |
| 2,707,334 | Skrobish | May 3, 1955 |